United States Patent [19]

DiBella et al.

[11] 4,166,163

[45] Aug. 28, 1979

[54] COLORED POLYURETHANE FOAMS AND A PROCESS FOR THEIR PRODUCTION

[75] Inventors: Eugene P. DiBella, Piscataway; Morris Dunkel, Paramus; Henry Gould, Englishtown, all of N.J.

[73] Assignee: Tenneco Chemicals, Inc., Saddle Brook, N.J.

[21] Appl. No.: 923,762

[22] Filed: Jul. 11, 1978

[51] Int. Cl.² .................................................. C08J 9/00
[52] U.S. Cl. ................................ 521/116; 106/308 B; 521/117; 521/920
[58] Field of Search ..................... 521/116, 117, 920; 106/308 B

[56] References Cited

U.S. PATENT DOCUMENTS

| 3,405,077 | 10/1968 | Pastor et al. | 521/116 |
| 3,806,474 | 4/1974 | Blair | 521/116 |

Primary Examiner—Lewis T. Jacobs
Attorney, Agent, or Firm—Evelyn Berlow

[57] ABSTRACT

Colored polyurethane foams are prepared by the reaction of a polyisocyanate with a component that contains at least two compounds having functional groups containing active hydrogen atoms and that comprises a polyol and a dispersion of a pigment in a low-viscosity, semi-reactive vehicle that comprises a glycol monocarboxylate, such as 1,2-propylene glycol mononeodecanoate.

19 Claims, No Drawings

COLORED POLYURETHANE FOAMS AND A PROCESS FOR THEIR PRODUCTION

This invention relates to colored polyurethane foams and to a process for their production. It further relates to pigment dispersions that are used in the production of colored polyurethane foams.

Polyurethane foams have insulating and cushioning characteristics that make them ideal for use in clothing, mattresses, rug and upholstery padding, soundproof walls, air filters, packaging, and household appliances. In many of these applications, it has become important to provide a means for coloring the foams to enhance their appearance. A number of procedures have been proposed for the production of colored polyurethane foams, but none has proven to be entirely satisfactory. For example, when a polyurethane foam is dyed with a direct dye, the product often does not have suitable color fastness. The incorporation of a pigment into the reaction mixture prior to foam formation is unsatisfactory because the products are not uniformly colored and because the final coloration cannot be adequately controlled. The use of pigments that are coated with a polymeric material usually has an adverse effect on the physical properties of the foam. Another proposed process for the production of colored polyurethane foams involves the incorporation into the reaction mass of a dispersion of a pigment in a reactive polyester diol type vehicle. Because of their high viscosities, however, these dispersions are difficult to handle and to incorporate uniformly in the reaction mixture. In addition, the use of these polyfunctional vehicles, which act as polymer chain termination agents or are directly incorporated into the polymer backbone, generally damages the pore structure of the foam.

In accordance with this invention, it has been found that polyurethane foams having uniform and strong coloration can be obtained by incorporating in the polyurethane reaction mixture a dispersion of a pigment in a low-viscosity semi-reactive vehicle. The use of these pigment dispersions results in permanent coloration of the polyurethane foam without adversely affecting either foam formation or the physical properties of the product.

The pigment dispersions that are used in the preparation of the colored polyurethane foams are dispersions of pigments in semi-reactive vehicles that comprise certain glycol monocarboxylates. These dispersions are sufficiently low in viscosity to allow incorporation of a commercially-useful level of the colorant pigment into the polyurethane foam while maintaining sufficient fluidity to permit them to be poured or pumped. In addition, because the dispersions are compatible with all types of polyurethane foam formulations it is not necessary to modify the formulations to accomodate them. Because the pigment dispersions are relatively low in cost, their use does not add appreciably to the cost of preparing the products. The reactivity of the monofunctional, semi-reactive vehicle with isocyanates results in permanent coloration of the foam without interfering with the foam forming process and without damaging the pore structure of the foam.

The low-viscosity semi-reactive vehicles that are used in the preparation of the pigment dispersions comprise glycol monocarboxylates that have the structural formula

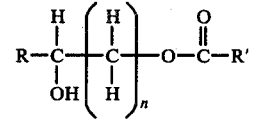

wherein R represents an alkyl group having 1 to 16 carbon atoms, an alkoxy group having 2 to 8 carbon atoms, an alkoxyalkyl group having 3 to 8 carbon atoms, or a polyalkoxy group having 3 to 8 carbon atoms; R' represents an alkyl group or an alkenyl group having 2 to 18 carbon atoms; and n is 1, 2, or 3. The preferred glycol monocarboxylates have the structural formula

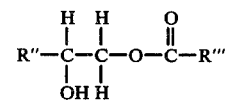

wherein R'' represents an alkyl group having 1 to 3 carbon atoms and R''' represents an alkyl group having 6 to 12 carbon atoms. Particularly preferred are the 1,2-propylene glycol monocarboxylates having the structural formula

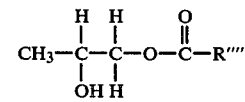

wherein R'''' represents a branched-chain alkyl group having 8 to 10 carbon atoms.

Because the preferred glycol monocarboxylates contain a secondary hydroxyl group, their reactivity with isocyanate is no greater than that of the polyester or polyether polyol that is used in the preparation of the polyurethane polymer, enabling these glycol monocarboxylates to be incorporated into the system with only minimal polymer chain termination. When glycol esters that contain primary hydroxyl groups are used in the preparation of the pigment dispersions, their greater reactivity results in products having less satisfactory physical properties, while the use of glycol esters that contain tertiary hydroxyl groups is less desirable because of the tendency of these esters to dehydrate at foam-forming temperatures.

Illustrative of the glycol monocarboxylates that can be used as the low-viscosity, semi-reactive vehicle in the pigment dispersions of this invention are the following: ethylene glycol monobutyrate, ethylene glycol mononeodecanoate, ethylene glycol monooleate, 1,2-propylene glycol monoisopropanoate, 1,2-propylene glycol monohexanoate, 1,2-propylene glycol monoisononanoate, 1,2-propylene glycol mononeodecanoate, 1,2-propylene glycol monolinoleate, 1,2-butylene glycol mono-2-ethylhexanoate, 1,3-butylene glycol mononeodecanoate, 1,3-hexylene glycol monobutyrate, 1,4-hexylene glycol monooleate, 1,2-decylene glycol monoacetate, 1,4-octadecyl glycol mono-2-ethylhexanoate, diethylene glycol monohexanoate, diethylene glycol mononeodecanoate, triethylene glycol monooctanoate, dipropylene glycol monononanoate, dipropylene glycol mono-2-ethylhexanoate, dipropylene glycol mononeodecanoate, and the like. Excellent results have been obtained when the semi-reactive vehicle comprised 1,2-propylene glycol mono-2-ethylhexanoate, 1,2-propylene glycol monoisononanoate, 1,2-propylene glycol neodecanoate, or a mixture of these esters.

The glycol monocarboxylates may be prepared by any suitable and convenient procedure. For example, they may be prepared by the alkoxylation of a monocarboxylic acid with an alkylene oxide that is preferably ethylene oxide or propylene oxide or by the direct esterification of a monocarboxylic acid with the appropriate glycol. The preparation of the esters should be carried out under conditions that minimize the formation of by-products that are glycol diesters. While the diesters will function as low-viscosity vehicles for pigment dispersions, their lack of hydroxyl functionality precludes isocyanate reactivity. Accordingly, pigment dispersions in the diesters will not impart long-lasting coloration to polyurethane foams.

The pigment dispersions of this invention contain from 5% to 20% by weight and preferably from 10% to 15% by weight of an inorganic pigment, an organic pigment, an extender pigment, or a mixture thereof. Examples of suitable inorganic pigments include carbon black, titanium dioxide, zinc oxide, aluminum oxide, magnesium oxide, antimony trioxides, cuprous oxides, iron oxides, chromium oxides, zinc sulfides, cadmium sulfides, cadmium selenides, lead chromate, and ultramarine blue. Examples of the organic pigments that may be used include azo, anthraquinone, benzidine, dianisidine, phthalocyanine, quinacridone, dioxazine, and isoindolinone pigments. Illustrative of the useful extender pigments are clay, calcium carbonate, talc, bentonite, kaolin, mica, silica, barium sulfate, and barium carbonate.

The pigment dispersions are prepared by grinding a mixture of the pigment and glycol monocarboxylate in a ball mill, pebble mill, sand mill, dispersion mill, colloid mill, or high shear mixer until a uniform dispersion is obtained. These dispersions are characterized by low viscosity, excellent stability, and compatibility with all types of polyurethane foam compositions.

The colored polyurethane foams of this invention are prepared by reacting an organic polyisocyanate with a component that contains at least two compounds having functional groups containing active hydrogen atoms and that comprises a polyol and a dispersion of a pigment in a low-viscosity semi-reactive vehicle that comprises a glycol monocarboxylate having the structural formula

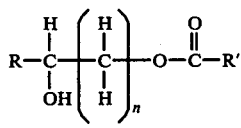

wherein R, R', and n have the aforementioned significance. The amount of the pigment dispersion that is used is that which will provide from 0.5 part to 25 parts by weight of the glycol monocarboxylate per 100 parts by weight of the polyol, with best results being obtained when from 1 part to 10 parts by weight of the glycol monocarboxylate is present for 100 parts by weight of the polyol.

The polyurethane foams may be made by any known method including the one-shot method, the total prepolymer method, the semi-prepolymer method, and modifications of these methods. In the one-shot method, the polyol, pigment dispersion, catalyst, blowing agent, and surfactant are blended together before being mixed with the isocyanate component. In the prepolymer processes, all or part of the polyol is mixed with the isocyanate before the surfactant, catalyst, blowing agent, pigment dispersion, and any remaining polyol are added.

Any of the polyols known to be suitable for preparing polyurethane resins may be used in the practice of this invention. These include polyalkylene ether glycols prepared from ethylene, propylene, or tetramethylene glycols, and polyesters prepared by reacting a dicarboxylic acid, such as phthalic acid, adipic acid, sebacic acid, succinic acid, or oxalic acid with a glycol or polyalkylene glycol, such as ethylene glycol, neopentyl glycol, diethylene glycol, propylene glycol, or butylene glycol. The polyols should have equivalent weights of 500 to 10,000, hydroxyl numbers of 15 to 700, and acid numbers of less than 50.

Any of a wide variety of organic isocyanates may be used, including aliphatic, cycloaliphatic, heterocyclic, and aromatic di- and polyisocyanates, and combinations of these isocyanates. Examples include 2,4-tolylene diisocyanate, 2,6-tolylene diisocyanate, phenylene diisocyanates, naphthylene diisocyanates, 4,4'-diphenylmethane diisocyanate, p,p'-diphenyl diisocyanate, methylene diisocyanate, trimethylene diisocyanate, tetramethylene-1,4-diisocyanate, butylene-1,4-diisocyanate, butylene-2,3-diisocyanate, hexamethylene diisocyanate, cyclohexylene-1,2-diisocyanate, methylene bis(4-phenylisocyanate), diphenyl-3,3'-dimethyl-4,4'-diisocyanate, xylylene diisocyanate, cyclohexane-1,4-diisocyanate, 1-methoxyphenyl-2,4-diisocyanate, benzene-1,2,4-triisocyanate, polymethylene polyphenylisocyanate, tolylene-2,4,6-triisocyanate, 4,4'-dimethyldiphenyl methane-2,2',5,5'-tetraisocyanate, 4,4'-biphenylene diisocyanate, triphenylmethane-4,4',4"-triisocyanate, cumylene 2,4-diisocyanate, durylene diisocyanate, 2,4-diphenylhexane-1,6-diisocyanate, 2-chlorotrimethylene diisocyanate, diphenyl-2,4,4'-triisocyanate, and the like and mixtures thereof. The aromatic diisocyanates, and particularly the tolylene diisocyanates, are generally the least expensive and most reactive polyisocyanates and therefore are preferred.

In addition to the polyisocyanate, polyol, and pigment dispersion, the reaction mixture may also contain surfactants, catalysts, blowing agents, foam stabilizers, plasticizers, and other materials that are commonly used in the production of polyurethane foams.

The process of this invention can be used to produce colored rigid, semi-rigid, and flexible polyurethane foams as well as colored unfoamed polyurethane compositions. It is of particular value in the production of colored flexible polyurethane foams.

The invention is further illustrated by the following examples.

EXAMPLE 1

A. To a three-liter glass vessel equipped with a stirrer, thermometer, addition funnel, and means for heating and cooling were added 1238 grams (7.18 moles) of neodecanoic acid and 6.0 grams of a 75% solution of methyl tricapryl ammonium chloride in isopropanol. The mixture was heated to 130° C. under nitrogen and maintained at 130°–135° C. for about twelve hours while 505 grams (8.72 moles) of propylene oxide was added to it. At the end of this time, the acid number of the reaction mixture was less than 0.5.

The reaction product was washed twice with 600 gram portions of water at 90°–95° C. for one hour and then dried at 120° C./20 mm Hg pressure under nitrogen for an additional hour. After treatment with 10 grams of filter-aid, the product was filtered. There was obtained 1595 grams (97% yield) of hydroxypropyl neodecanoate, which had a hydroxyl number of 241, saponification number of 240, acid number of 0.04, ratio of primary to secondary hydroxyl groups of 0.67, and viscosity at 25° C. of 38.1 centistokes (calculated for $C_{13}H_{26}O_3$: hydroxyl number, 244; saponification number, 244). The product was shown by GLC analysis to contain 97.0% by weight of propylene glycol mononeodecanoate, 2.5% by weight of dipropylene glycol mononeodecanoate, and 0.5% by weight of propylene glycol dineodecanoate.

B. A mixture of 352 grams of propylene glycol mononeodecanoate and 48 grams of a carbon black pigment (Raven 1035) was homogenized in a high speed sand mill to form a 12% pigment dispersion that had a viscosity at 25° C. of 8500 centistokes and was easily pourable.

C. The 12% pigment dispersion was incorporated into a flexible polyether polyurethane foam prepared from the following formulation using laboratory scale foam-making equipment:

|  | Parts by Weight |
| --- | --- |
| Propoxylated glycerine (3000 MW triol; hydroxyl no. 56) | 100 |
| Polysiloxane surfactant (Carbide DC 192) | 1.25 |
| Water | 3.7 |
| Stannous octoate | 0.25 |
| Amine catalyst (Dabco 33 LV) | 0.30 |
| Propylene glycol mononeodecanoate/ black pigment dispersion | 3.0 |
| Tolylene Diisocyanate (80:20 2,4-/2,6-isomer ratio) (-NCO Index: 1.08) | 49.3 |

Foam formation was unaffected by the presence of the carbon black dispersion. The uniform charcoal gray/black polyurethane foam obtained was equivalent in physical properties to a control foam prepared from the same formulation from which the pigment dispersion had been omitted.

EXAMPLE 2

A. The procedure described in Example 1A was repeated except that 1.0 mole percent of potassium neodecanoate was used to catalyze the propoxylation reaction. A 91.5% yield was obtained of a propylene glycol ester product that contained 60.8% by weight of propylene glycol mononeodecanoate, 11.2% by weight of dipropylene glycol mononeodecanoate, 27.2% by weight of propylene glycol dineodecanoate, and 0.8% by weight of dipropylene glycol dineodecanoate and that had a hydroxyl number of 174, saponification number of 254, acid number of 0.2, viscosity at 25° C. of 34.9 centistokes, and a ratio of primary to secondary hydroxyl groups of 3.5.

B. A 12% by weight dispersion of carbon black in this propylene glycol ester product was prepared by the procedure described in Example 1B. The dispersion, which was easily pourable, had a viscosity at 25° C. of 8600 centistokes.

C. The 12% pigment dispersion was incorporated into a flexible polyether polyurethane foam by the procedure described in Example 1C. The uniform charcoal gray/black polyurethane foam obtained was equivalent in physical properties to a control foam prepared from the same formulation from which the pigment dispersion had been omitted.

EXAMPLE 3

The 12% carbon black dispersions in propylene glycol mononeodecanoate, whose preparation is described in Examples 1B and 2B, were incorporated into a flexible polyester polyurethane foam prepared from the following formulation using laboratory scale foam-making equipment:

|  | Parts by Weight |
| --- | --- |
| Poly(diethylene adipate)diol composition (Tenneco Polyester III) (hydroxyl no., 58.4) | 100 |
| Polysiloxane surfactant (Carbide L-532) | 1.2 |
| Stannous octoate/tricresyl phosphate (1:1 wt./wt. mixture) | 0.05 |
| Hexadecyl dimethyl amine | 0.30 |
| N-Ethylmorpholine | 0.35 |
| Silicone amine (Carbide NIAX NES) | 0.25 |
| Water | 3.6 |
| Propylene glycol mononeodecanoate/ black pigment dispersion | 3.0 |
| Tolylene Diisocyanate (80:20 2,4-/2,6-isomer ratio) (-NCO Index, 1.01) | 45.2 |

In each case, foam formation and foam properties were unaffected by the presence of the pigment dispersion, and a uniform charcoal gray/black polyurethane foam was obtained.

EXAMPLE 4

A 15% carbon black dispersion in propylene glycol mononeodecanoate was prepared by the procedure described in Example 1B. The dispersion, which was easily pourable and which had a viscosity at 25° C. of 10,500 centistokes, was used in the preparation of a flexible polyether polyurethane foam by the procedure described in Example 1C. The foam formation and foam properties were unaffected by the presence of the pigment dispersion, and a uniform charcoal gray/black polyurethane foam was obtained.

EXAMPLE 5

A 12% dispersion of 2915 Dianisidine Orange (Harshaw Chemical Co.) in propylene glycol mononeodecanoate was prepared by the procedure described in Example 1B. The easily-pourable dispersion, which had a viscosity at 25° C. of 11,000 centistokes, was used in the preparation of a flexible polyether polyurethane foam by the procedure described in Example 1C. The foam formation and foam properties were unaffected by the presence of the pigment dispersion, and a uniformly-colored polyurethane foam was obtained.

EXAMPLE 6

A 16% dispersion of AAOT Benzidine Yellow 274-1744 (Sun Chemical Co.) in the propylene glycol mononeodecanoate whose preparation is described in Example 2A was prepared by the procedure described in Example 1B. The incorporation of this easily-pourable dispersion, which had a viscosity at 25° C. of 20,000 centistokes, into a flexible polyether polyurethane foam using the procedure described in Example 1C did not affect either foam formation or foam properties.

EXAMPLE 7

A. The procedure described in Example 2A was repeated except that the carboxylic acid reactant was isononanoic acid. A 92% yield of propylene glycol monoisononanoate was obtained. The product had a hydroxyl number of 178, saponification number of 282, acid number of 0.05, and viscosity at 25° C. of 18.2 (Calculated for $C_{12}H_{24}O_3$: hydroxyl number, 260; saponification number, 260).

The discrepancy between the hydroxyl number and the saponification number indicates that the product contains a significant amount of diester components.

B. A 12% dispersion of carbon black in propylene glycol monoisononanoate was prepared by the procedure described in Example 1B.

C. The easily-pourable dispersion was incorporated into a flexible polyether polyurethane foam by the procedure described in Example 1C. Neither the foam formation nor the foam properties were affected by the presence of the pigment dispersion.

EXAMPLE 8

A. The procedure described in Example 2A was repeated except that the carboxylic acid reactant was 2-ethylhexanoic acid. A 91% yield of propylene glycol mono-2-ethylhexanoate was obtained. The product had a hydroxyl number of 156, saponification number of 300, an acid number of 0.03, and a viscosity at 25° C. of 18.7 centistokes (Calculated for $C_{11}H_{22}O_3$: hydroxyl number, 278; saponification number, 278). This product contained a significant amount of diester components.

B. A 12% dispersion of carbon black in propylene glycol mono-2-ethylhexanoate was prepared by the procedure described in Example 1B.

C. The easily-pourable pigment dispersion was incorporated into a flexible polyether polyurethane foam by the procedure described in Example 1C. Neither foam formation nor the foam properties were affected by the presence of the pigment dispersion.

EXAMPLE 9

A 12% dispersion of carbon black in 2,2,4-trimethylpentyl-3-hydroxypentyl isobutyrate was prepared by the procedure described in Example 1B. The pourable dispersion had a viscosity at 25° C. of 20,000 centistokes.

When this dispersion was used in the preparation of a flexible polyether polyurethane foam by the procedure described in Example 1C or the preparation of a flexible polyester polyurethane foam by the procedure described in Example 3, neither foam formation nor foam properties were affected by the presence of the pigment dispersion.

COMPARATIVE EXAMPLE

A. The procedure described in Example 2A was repeated except that the carboxylic acid reactant was dimer acid (Emery Empol 1015A). The $C_3H_6O$/COOH mole ratio was 1.1/1.0. The bis(hydroxypropyl)dimerate had a hydroxyl number of 94, an acid number of 0.1, and a viscosity at 25° C. of 10,000 centistokes (Calculated for $C_{36}H_{66}O_4$: hydroxyl number, 166). The low hydroxyl number and high viscosity indicate that the product contained 40-45% of poly(propylene glycol dimerate) components and 55-60% of bis(hydroxypropyl)dimerate.

B. A 12% dispersion of carbon black (Raven 1035) in the propylene glycol dimerate composition had a viscosity at 25° C. of more than 100,000 centistokes. Because it was not pourable at ambient temperature and it could not be pumped with conventional equipment, it was not suitable for use as a polyurethane foam colorant additive.

Each of the other glycol monocarboxylates disclosed herein can be also used as the low-viscosity, semi-reactive vehicle for pigment dispersions that are to be used in the production of colored polyurethane foams.

What is claimed is:

1. A colored polyurethane foam prepared by the reaction of an organic polyisocyanate with a component that contains at least two compounds having functional groups containing active hydrogen atoms and that comprises a polyol and a dispersion of a pigment in a low-viscosity semi-reactive vehicle that comprises a glycol monocarboxylate having the structural formula

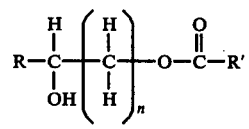

wherein R represents an alkyl group having 1 to 16 carbon atoms, an alkoxy group having 2 to 8 carbon atoms, an alkoxyalkyl group having 3 to 8 carbon atoms, or a polyalkoxy group having 3 to 8 carbon atoms, R' represents an alkyl group or an alkenyl group having 2 to 18 carbon atoms, and n is 1, 2, or 3, said component containing from 0.5 part to 25 parts by weight of the glycol monocarboxylate per 100 parts by weight of the polyol.

2. A colored polyurethane foam as defined in claim 1 wherein the polyisocyanate is reacted with a component that contains from 1 part to 10 parts by weight of the glycol monocarboxylate per 100 parts by weight of the polyol.

3. A colored polyurethane foam as defined in claim 1 wherein the vehicle of the pigment dispersion comprises a glycol monocarboxylate having the structural formula

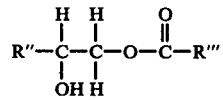

wherein R" represents an alkyl group having 1 to 3 carbon atoms and R''' represents an alkyl group having 6 to 12 carbon atoms.

4. A colored polyurethane foam as defined in claim 1 wherein the vehicle of the pigment dispersion comprises a 1,2-propylene glycol monocarboxylate.

5. A colored polyurethane foam as defined in claim 1 wherein the pigment dispersion contains from 5% to 20% by weight of pigment.

6. A colored polyurethane foam as defined in claim 1 wherein the pigment dispersion contains from 10% to 15% by weight of pigment.

7. A colored polyurethane foam as defined in claim 1 wherein the pigment dispersion contains 10% to 15% of carbon black in a vehicle that comprises 1,2-propylene glycol neodecanoate.

8. The process for the production of colored polyurethane foams that comprises reacting an organic polyisocyanate with a component that contains at least two compounds having functional groups containing active hydrogen atoms and that comprises a polyol and a dispersion of a pigment in a low-viscosity, semi-reactive vehicle that comprises a glycol monocarboxylate having the structural formula

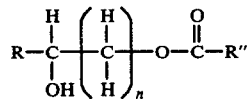

wherein R represents an alkyl group having 1 to 16 carbon atoms, an alkoxy group having 2 to 8 carbon atoms, an alkoxyalkyl group having 3 to 8 carbon atoms, or a polyalkoxy group having 3 to 8 carbon atoms, R' represents an alkyl group or an alkenyl group having 2 to 18 carbon atoms, and n is 1, 2, or 3, said component containing from 0.5 part to 25 parts by weight of the glycol monocarboxylate per 100 parts by weight of the polyol.

9. The process of claim 8 wherein the polyisocyanate is reacted with a component that contains from 1 part to 10 parts by weight of the glycol monocarboxylate per 100 parts by weight of the polyol.

10. The process of claim 8 wherein the vehicle of the pigment dispersion comprises a glycol monocarboxylate having the structural formula

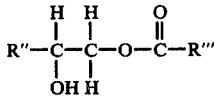

wherein R" represents an alkyl group having 1 to 3 carbon atoms and R''' represents an alkyl group having 6 to 12 carbon atoms.

11. The process of claim 8 wherein the vehicle of the pigment dispersion comprises a 1,2-propylene glycol monocarboxylate.

12. The process of claim 8 wherein the pigment dispersion contains from 5% to 20% by weight of pigment.

13. The process of claim 8 wherein the pigment dispersion contains from 10% to 15% by weight of pigment.

14. The process of claim 8 wherein the pigment dispersion contains from 10% to 15% by weight of carbon black in a vehicle that comprises 1,2-propylene glycol neodecanoate.

15. A pigment dispersion for use in the production of colored polyurethane foams that comprises from 5% to 20% by weight of a pigment in a low-viscosity, semi-reactive vehicle that comprises a glycol monocarboxylate having the structural formula

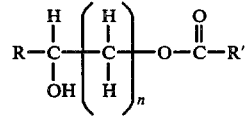

wherein R represents an alkyl group having 1 to 16 carbon atoms, an alkoxy group having 2 to 8 carbon atoms, an alkoxyalkyl group having 3 to 8 carbon atoms, or a polyalkoxy group having 3 to 8 carbon atoms, R' represents an alkyl group or an alkenyl group having 2 to 18 carbon atoms, and n is 1, 2, or 3.

16. A pigment dispersion as defined in claim 15 that contains from 10% to 15% by weight of pigment.

17. A pigment dispersion as defined in claim 15 wherein the vehicle comprises a glycol monocarboxylate having the structural formula

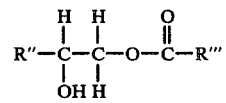

wherein R" represents an alkyl group having 1 to 3 carbon atoms and R''' represents an alkyl group having 6 to 12 carbon atoms.

18. A pigment dispersion as defined in claim 15 wherein the vehicle comprises 1,2-propylene glycol monocarboxylate.

19. A pigment dispersion as defined in claim 15 that contains from 10% to 15% by weight of carbon black in a vehicle that comprises 1,2-propylene glycol mononeodecanoate.

* * * * *